United States Patent [19]

Lefrou et al.

[11] Patent Number: 5,822,107
[45] Date of Patent: Oct. 13, 1998

[54] ELECTRICALLY DRIVABLE GLAZING

[75] Inventors: Christine Lefrou, Ivry sur Seine; Didier Perrin, Paris, both of France

[73] Assignee: Saint-Gobain Vitrage, Courbevoie, France

[21] Appl. No.: 578,426

[22] Filed: Dec. 26, 1995

[30] Foreign Application Priority Data

Dec. 23, 1994 [FR] France .................................. 94 15565

[51] Int. Cl.$^6$ .............................. G02F 1/153; G09G 5/00
[52] U.S. Cl. ......................... 359/273; 359/265; 359/268; 359/275; 345/205
[58] Field of Search ..................... 345/105; 359/265–275

[56] References Cited

U.S. PATENT DOCUMENTS

| | | | |
|---|---|---|---|
| 4,121,202 | 10/1978 | Gissane ................................... | 349/142 |
| 4,298,870 | 11/1981 | Saegusa ................................... | 359/265 |
| 5,231,531 | 7/1993 | Defendini ................................ | 359/275 |
| 5,246,782 | 9/1993 | Kennedy et al. ....................... | 428/421 |
| 5,581,406 | 12/1996 | Kobayashi et al. .................... | 359/267 |

FOREIGN PATENT DOCUMENTS

| | | |
|---|---|---|
| 0 568 457 | 11/1993 | European Pat. Off. . |
| 30 32 680 | 4/1982 | Germany . |

OTHER PUBLICATIONS

Patent Abstracts of Japan, vol. 14, No. 516 (P–1130), Nov. 13, 1990, JP–A–2 216 131, Aug. 29, 1990.
Patent Abstracts of Japan, vol. 12, No. 456 (P–793), Nov. 30, 1988, JP–A–63 179 334, Jul. 23, 1988.
Patent Abstracts of Japan, vol. 15, No. 116 (P–1182), Mar. 20, 1991, JP–A–3 006 534, Jan. 14, 1991.
Patent Abstracts of Japan, vol. 18, No. 387 (P–1773), Jul. 20, 1994, JP–A–6 110 087, Apr. 22, 1994.
Patent Abstracts of Japan, vol. 15, No. 214 (P–1209), May 31, 1991, JP–A–3 059 545, Mar. 14, 1991.

*Primary Examiner*—Nabil Hindi
*Assistant Examiner*—Evelyn A. Lester
*Attorney, Agent, or Firm*—Oblon, Spivak, McClelland, Maier & Neustadt, P.C.

[57] ABSTRACT

A process for electrical power supply of at least one electrically drivable glazing of the electrochromic type for the purpose of causing variation of the state of coloration thereof. An electrical drive circuit includes an electrical connection to connect electrically conductive layers of the glazing to the drive circuit. An electricity generator supplies power to the electrochromic glazing under instruction of a control unit equipped with a user interface, and which utilizes a counter for counting a time and which measures and computes physical characteristics of the drive circuit and of the glazing, including at least measuring the electrical voltage between two distinct points of the electrochromic structure of the glazing, and measuring the electric current and measuring the state of coloration of the glazing.

22 Claims, 3 Drawing Sheets

FIG_1

FIG_2

ELECTRICALLY DRIVABLE GLAZING

BACKGROUND OF THE INVENTION

1. Field of the Invention

The present invention relates to electrically drivable systems of variable coloration of the electrochromic type, and, more especially, an electrochromic glazing and in particular the process of electrical power supply in an electrochromic glazing.

2. Discussion of the Background

Electrochromic glazings are, in fact, glazings of energy and/or light transmission which are electrically drivable, in other words glazings having transmissions which can be modified in certain wavelengths of the electromagnetic radiation, particularly in the infrared and/or in the visible range, under the effect of an electrical power supply.

Such glazings are of particular interest for equipping buildings or vehicles in order to control the solar input within the rooms or passenger compartments therein. It is also possible to make use thereof to form internal partitions in buildings or even to combine such glazings with mirrors of the rearview type in order to prevent the phenomena of dazzling.

The principle of operation of such glazings is the following. The glazings include a layer of a material having an electrochromic property, which is capable of reversibly inserting cations, especially protons $H^+$ or cations of an alkali metal such as lithium $Li^+$, and thus passing from one degree of oxidation to another, each one of the degrees of oxidation corresponding to a different state of coloration.

Thus, tungsten trioxide, which is virtually colorless in its oxidized state (a), is of an intense midnight blue coloration in its reduced state (b) obtained by injecting cations $M^+$ in accordance with the following reaction:

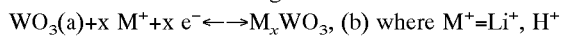

$WO_3(a) + x\ M^+ + x\ e^- \rightleftarrows M_xWO_3$, (b) where $M^+ = Li^+, H^+$ The insertion reaction assumes a source of cations and a source of electrons. On the other hand, in a complete system, the creation of a good reversibility, at least for a large number of insertion/removal cycles, is dependent upon the presence of a counter electrode, which is itself also capable of inserting and of removing cations in a reversible and complementary fashion in relation to the principal electrode.

This is the reason why electrochromic glazings are usually constituted by two substrates, usually of glass, between which there are disposed two transparent electrically conductive layers equipped with current leads, these layers being separated successively by an electrode formed by a cathodic electrochromic material such as $WO_3$, an electrolyte suitable for ensuring a transfer of cations and, finally, a counter electrode inserting or removing the cations symmetrically in relation to the electrode. Preferably, the counter electrode is likewise of an electrochromic material, an anodic electrochromic material such as iridium oxide or nickel oxide being associated with a cathodic electrochromic material such as $WO_3$. Such an anodic electrochromic material is colorless in the reduced state (or inserted state) and is colored in the oxidized (or removed) state. As a result of this, it permits enhancement of the coloration contrast of the glazing.

An ideal operation of an electrochromic glazing would include permitting the user, by electrical drive, to cause the glazing to pass at will from one degree of coloration to another within a given light transmission range and/or within a given energy transmission range, in a reproducible fashion, with switching times (that is to say coloration modification times) which are reasonable, irrespective of the conditions of utilization of the glazing and irrespective of a size of the glazing.

Now, this is an objective which is not easy to achieve, to the extent that there are, in fact, many participating parameters and constraints associated with the actual constitutive materials of the electrochromic glazing, leading to all the endeavors which are currently being made for the purpose of developing appropriate electrical power supply systems.

Thus, the Patent EP-408 427 proposes a power supply system utilizing a voltage generator of the potentiostat type and a circuit incorporating 3 electrodes which permits a substantial increase in the switching speeds of electrochromic glazings without, however, running the risk of applying to them voltages which are liable to cause within them harmful parasitic reactions which may, for example, lead to the formation of bubbles by the liberation of gases.

The Patent EP-475 847 proposes, moreover, adjustment of the voltage profiles applied to the glazings as a function of their temperature, to the extent that their electrochemical "response" under the application of an electric field is quite closely dependent upon this parameter, on account, in particular, of the variations of conductivity of the electrolyte disposed between the two layers of electrochromic materials and ensuring the transfer of cations from one to the other.

The power supply system provided in the European Patent EP-0 568 457 consists in determining the "charge" of the electrochromic glazing at a given instant as well as the charge which has to be applied to it in order to obtain the desired coloration modification, this taking place as a function of the potential on release of the glazing and of a setpoint potential.

Finally, the Patent Application EP-683 419 chooses to supply power to electrochromic glazings not with a voltage generator, but with a current generator, which is capable of delivering currents which are determined as a function of the number of charges to be transferred in order to obtain the desired change of coloration and as a function of the chosen switching time. Such a system permits the electrical drive to be freed to a certain extent from the fluctuations of the behavior of the electrochromic glazings, especially when their temperature of utilization varies.

However, there in always the need for an electrical drive for electrochromic glazings, which electrical drive can respond on a more universal and total basis to all the constraints of operation of these types of glazings, irrespective of their intrinsic characteristics or their conditions of utilization.

SUMMARY OF THE INVENTION

Accordingly, one object of the present invention is the novel optimization of a drive system for electrochromic glazings, which drive system can adapt to any type of glazing and any type of condition of utilization, and which succeeds, in particular, in reconciling in the best possible way reliability, performance levels and long service life of the glazing on the one hand, and simplicity of operation for the user on the other hand.

The electrochromic systems falling within the scope of the present invention are systems based on an electrochemical reaction involving the passage of an electric current which must be supplied to the system at least for one of the directions of the reaction or, most frequently, in both reaction directions.

Some of the systems are systems based an the reversible insertion of cations into metal oxides. In the text which follows, and for the sake of greater clarity, reference will be made essentially to such systems in order to set forth the difficulties which are prevented, but the present invention should nevertheless not be considered restricted to this type of electrochromic system. Moreover, the present invention is applicable just as much to electrochromic systems utilized as glazings as to systems utilized as batteries.

The subject of the present invention is a process for the electrical power supply of at least one electrically drivable glazing of the electrochromic type, for the purpose of causing variation of the state of coloration thereof, and which utilizes, in order to achieve this, an electrical drive circuit including various elements, including electrical connection means to be connected in particular to the electrically conductive layers of the glazing or glazings. The circuit likewise includes an electricity generator to supply power to the electrochromic glazing or glazings thus connected, under the instruction of a control unit equipped with a user interface. To define its power supply instructions, this control unit utilizes various means, including a means for counting time and means for measuring and/or for computing physical characteristics of the circuit and of the glazing(s). These means comprise at least one means for measuring the electrical voltage between two distinct points of the electrochromic structure of the glazing or of at least one of the glazings, as well as a means for measuring the electric current and means for measuring "the state of coloration" of the glazing, or of at least one of the glazings.

The electrochromic structure (or "the electrochromic stack") is a structure of the same type as that described in the above cited patents and includes at least one layer formed of an electrochromic material, this structure being customarily bounded by two electrically conductive layers equipped with their current leads. The means for measuring the electrical voltage which is mentioned in the process of the present invention measures the voltage between two distinct "points" (or zones) of this structure, each point being chosen, for example, on one of the two extreme electrically conductive layers bounding the electrochromic structure (or on the current lead which is allocated to it, for example a strip of screen-printed enamel) or between these two layers.

Generally, the measuring means mentioned in the preceding paragraph determines the voltage at the terminals of the (of at least one of the) glazing(s), that is to say between two points of the extreme electrically conductive layers of the electrochromic stack and/or of their current leads, the resistive loss in the electrical connection means connected to the layers being in this case relatively negligible, as illustrated in particular in the embodiments of the present invention which follow. The points between which the voltage measurements are made may be "diametrically" opposite, or may face one another on the pattern, for example, of the Patent EP-408 427, etc . . . On an illustrative (but not limiting) basis, the measurement may also be made between a point of one of the extreme electrically conductive layers of the electrochromic structure (or of a current lead which is allocated to it) and any point situated between the two extreme electrically conductive layers and distinct from these layers, this point corresponding, for example, to a reference electrode or pseudo-reference electrode, etc . . .

It is likewise possible to utilize one or more measuring means to measure a plurality of voltages between different points of the glazing (for example to measure a voltage between a point of one of the extreme electrically conductive layers of the electrochromic structure and a point situated between the two extreme electrically conductive layers and to measure another voltage between this latter point and a point of the other extreme electrically conductive layer).

In the remaining part of the text, for the sake of greater simplicity, reference is made only to a voltage measured between two distinct points of the electrochromic structure, but the teachings given for this voltage likewise apply to a voltage or to at least one voltage or to each voltage in the case where a plurality of voltages are measured, this case likewise forming part of the present invention.

The process of the present invention implements a circuit of the type previously described implementing a certain number of steps, including the following steps.

An initialization of the control unit is carried out using the characteristic operating data of the glazing(s) and of the circuit, including the two limits of the range of possible states of coloration. This step is important, to the extent that it includes "informing" the control unit, at the start, of all the parameters which are liable to have an effect at its power supply setpoint. This may involve, in particular, the taking into account of the nature of the electrochromic materials or of the electrolyte chosen, of the size or the glazing in question, of the operational voltage ranges, and/or of the resistive losses due to the wiring system adopted in the electrical circuit. As mentioned previously, an essential datum does however continue to be the determination of the possible coloration range in dependence upon the glazing, the two limits of this range permitting the definition of its maximum contrast. It may also be important to inform the control unit of "the state of coloration" occupied by the glazing at the instant of its connection to the electrical drive circuit. Thus, this step includes preadjustments which are within the field of a specialist operator.

Once the glazings are connected and the electrical circuit is under conditions of normal operation, the user may then, with the aid of the user interface of the control unit, activate a drive command to modify the state of coloration, that is to say either a coloration drive command or a decoloration drive command, irrespective of the state of coloration of the glazing at the instant of the drive command.

The control unit then records the drive command and releases a power supply setpoint to the generator for an appropriate response. This setpoint is dependent upon the operational data with which the control unit was initialized and upon the measurements of the physical characteristic of the circuit and/or of the glazing, including the actual measurement of "the state of coloration" of the glazing on the occasion of the activation of the drive command or the reading of this "state of coloration" stored by the control unit, especially at the end of the power supply setpoint released by the preceding coloration modification drive command.

While the generator delivers electricity under instruction of the control unit, the control unit "follows" the modification of the state of coloration of the glazing, by the appropriate measuring means. In order to guarantee the proper performance of the switching of the glazing, the control unit verifies, at a given frequency, compliance with a certain number of safety criteria, based on the operational data with which it was initialized, which it compares with the physical characteristic(s) supplied by the measuring means and computing means of the circuit. This criteria will be detailed hereinbelow. It is to a large extent by these systematic verifications that assurance is given of the reliability, especially of the long service life, of the electrochromic glazing. Preferably, the control unit verifies these criteria at least once after recording of a drive command, even before releasing a power supply setpoint, in order to block the electricity supply process from the outset in the event of noncompliance.

Indeed, the control unit modifies it power supply setpoint and/or warns the user in the event of noncompliance with at least one of these safety criteria, in order to prevent the placing of the glazing(s) in a degrading state, for example in the event of incorrect operations specific to the glazing or to the elements of the circuit (of the accidental disconnection type) or in the event of external events of the extreme climatic conditions type.

The process likewise provides for a halting of the power supply instruction from the control unit to the generator, caused by two situations; either this involves an intentional interruption of the coloration modification drive command at the user interface by the user, in order to "halt" the glazing in an intermediate coloration state; or the control unit in "following" the state of coloration of the glazing, determines that the coloration target fixed by the instruction has been reached. The control unit then reverts, in both cases, to the situation of awaiting a drive command.

Thus, in normal operation, between two switching phases commanded by the user (or an automatic manner, as will be seen hereinbelow), the control unit preferably cuts any electricity supply by the generator, if only in the interests of saving energy, as the electrochromic glazings exhibit the property of being able to retain their state of coloration for a great length of time without power supply.

Advantageously, the previously stated modification of the power supply instruction in the event of noncompliance with one of the safety criteria may simply include that the control unit actuates the immediate opening of the electrical circuit. A provision then remains to be made for a reversion to the normal waiting position of the control unit, either by automatic reenergization after a specified period initialized at the outset with the aid of the means for counting time, or by manual reenergization by an operator.

In normal operation, when the safety criteria are complied with, the halting of the power supply instruction by the control unit in order to reach the coloration target specified in the instruction may be implemented by imposing in particular two conditions, which are preferably alternative. One condition includes measuring the current flowing in the circuit, for example at the terminals of the glazing(s) or of the generator, and in halting the instruction as soon as it reaches an initialized minimum value, this being a value which may be chosen for example between 0.1 and 10 mA. The other condition includes following the modification "of state of coloration" of the glazing(s), and in halting the instruction as soon as the "state of coloration" reaches one or the other of the two limits of the possible coloration range (or any intermediate state of coloration between these two limits).

This following of the state of coloration of the glazing may be undertaken in various ways, in a direct or indirect manner. It is in particular possible to undertake a following of the variation of the light transmission $T_L$ specific to the glazing, with the aid of a suitable sensor fixed to the glazing, for example of the type including a photoelectric cell associated with a small reflecting surface. The two limits of the possible coloration range are then expressed in value of $T_{L(d)}$ for example by approximately 50% in the most decolored state and in value of $T_{L(c)}$, for example by approximately 5% in the most colored state.

However, it may be preferred to undertake a following of "the state of charge" of the glazing, by measuring, for example, the quantity of charges transferred at the terminals of the glazing(s), especially with the aid of a current integrator of the coulometer type. The two limits of the coloration range are then $Q_{(d)}$ in the most decolored state, and $Q_{(c)}$ in the most colored state. These values $Q_{(d)}$ and $Q_{(c)}$ are in fact to be determined as a function of numerous parameters, especially the size of the glazing(s), the type of wiring circuit or again whether there is only one glazing or a plurality, connected in series or in parallel . . . This state of charge thus measured is in fact representative of the level of insertion of cations into the cathodic electrochromic material of the $WO_3$ type.

A final way of operating includes following the state of coloration by measurement of the (of at least one) release potential between two distinct points of the electrochromic structure of the glazing(s), for example with the aid of a means of the voltmeter type, in particular by adapting the technique described in the above cited Patent EP-0 568 457.

The power supply is certainly capable of supplying, with the aid of a single generator, a plurality of electrochromic glazings, in particular at least two glazings. The glazings are preferably connected in parallel if a generator of the voltage generator type is chosen, and preferably in series if a generator of the current generator type is chosen. If the glazings are of identical characteristics, the necessary measurements may be made only at one of the glazings.

Moreover, the process according to the present invention may further include a step of automatic energization, with the aid of the counting means of the clock type, of a power supply instruction from the control unit to the generator, which instruction is intended to decolor the glazing(s) as soon as the glazing(s) have been maintained in a state of coloration, whatever it might be, for a time at least equal to a specified duration, the value of which may be initialized for example of the order of 5 to 6 hours, or at an initialized fixed time or again at a given frequency, which is likewise initialized.

This step has the benefit of taking into account, in pragmatic fashion, the fact that current electrochromic glazings exhibit only a limited capability to preserve a given state of coloration in the absence of any power supply. When the glazing is no longer subjected to an electric field under the effect of a drive command, the electrochromic materials do in fact have a tendency to return to the most stable state, and in particular, $WO_3$ tends in the long term to return to its "removed" state, that is to say to its decolored state.

An obligatory change to the decolored state after a certain time may permit the avoidance of loss of control concerning the modification of coloration of the glazing, especially when there is no direct measurement of the light transmission of the glazing in order to "follow" its state of coloration. Once the glazing is thus completely decolored it also authorizes, possibly, a likewise automated reenergization by the control unit of a power supply instruction with a view to a recoloration of the glazing. By this automatic decoloration, assurance is provided of the coherence, between the actual "state of coloration" of the glazing at a given instant, when it is not subject to a power supply instruction by the generator, and "the state of coloration" which the control unit was able to store at the end of the power supply instruction of the last recorded coloration modification drive command.

This step is merely optional. It is in particular not necessary in the case where it is possible at any instant to make an actual measurement of "the state of coloration" of the glazing, especially when use is made of a light transmission sensor for this.

The power supply process of the present invention moreover permits advantageously, in normal operation, the activation of the coloration modification drive command in a manual fashion by a nonspecialist user, in particular with the aid of three drive commands: coloration/decoloration/halt. These drive commands may take the form of three distinct setting buttons or of a single selector button or cursor permitting the user to choose a given state of coloration between 0 and 100% of the range of possible states of coloration.

However, it may also provide that the control unit itself releases the coloration modification drive command by an automated control. Thus, this control may be slaved to the measurement, for example, of the illumination within a room or a passenger compartment, or of the solar flux received by the glazing, using appropriate sensors. Thus, when the electrochromic glazings are intended to equip building facades, the control may provide coloration which is stronger, the greater the illumination within the room or the solar flux received by the glazing, or, in contrast, if the glazings are to have a "shutter effect", may provide a maximum coloration at night. It is also possible to provide a complete decoloration of the glazing at night, in particular where vehicle glazings are involved.

Let us now come to a safety criterion which it may be important that the control unit should verify, as a general rule, when the generator supplies power to the glazing. This involves measuring the electric current, for example with an ammeter at the terminals of the generator and/or of the glazing(s). This must be different from zero, since, otherwise, this means that there has been accidental cutoff of the circuit, completely falsifying the determination of the power supply instruction by the control unit.

A first embodiment includes choosing a generator which should be a voltage generator capable of delivering, under instruction from the control unit, a voltage $U(g)$ such that the (or "one of the" in the case where a plurality of voltages between different points of the glazing are measured) voltage(s) $U(v)$ measured between two distinct points of the electrochromic structure of the (of at least one of the) glazing(s) is equal to a setpoint voltage $U(c)$, the profile of which is a function of the activated drive command and the temperature. The control unit has access to the temperature either directly via a sensor of the thermocouple type fixed or in proximity to the glazing, or indirectly with the aid of an electrical pulse u (pulse) delivered by the voltage generator in advance, especially by adapting the technique described in the above-cited patent EP-0 475 847.

Four safety criteria may advantageously be taken into account with this power supply mode, where the generator delivers a voltage, in particular the following.

A first safety criteria is to require that the measured temperature should remain within an initialized range of temperatures, in particular ranging from approximately −20° C. to +80° C. Clearly, everything depends on the choice of the materials of the glazing and of its performance levels, but the application of the voltage at too high a temperature may give rise to deteriorations, while an extremely low temperature tends not so much actually to deteriorate the glazing as to cause a prolongation of the switching times which is taken to excess.

A second safety criteria is to require that the difference in absolute value $[U(c)-U(v)]$ should remain below or equal to a given value, initialized at the outset, in particular of approximately 25 mV. This ensures similarity between the setpoint potential and that actually measured, and precautions are taken against any accidental disconnection of the voltmeter.

A third safety criteria is to require that, after measurement of the temperature T, and computation of its differential T' with respect to time, the differential remains less than or equal to an initialized value, in particular of approximately 1 K/s. This protects the glazing from the harmful effect which might be caused by an untimely rupture of the circuit of the means for measuring the temperature of the thermocouple type.

A fourth safety criteria is to require that the difference in absolute value $[U(g)-U(c)]$ should remain less than or equal to the product of the current i measured in the circuit, for example at the terminals of the generator, and a value r equivalent to a resistance, an initialized value. This product is, in fact, an approximation to the maximum value which can be reached by the sum of the resistance drops of the electrical circuit in its entirety, except those due to the electrochromic glazing(s) itself (themselves).

It is self-evident that it is not essential to verify systematically the entirety of these criteria, and that it is possible to retain only those which may prove to be actually important as a function, in particular, of the envisaged application of the glazing (in particular, whether it is mounted inside or outside).

A second embodiment includes choosing, rather, a current generator which is capable of delivering, under a power supply instruction received from the control unit, a current of a profile adapted to the activated drive command. Specific details concerning such a choice of generator may be obtained on reading the above-cited Patent application EP-693 419.

In this case, a safety criterion which is specific to this powering mode may include that, at least when the coloration modification drive command is a decoloration command, the control unit requires a reduction of the current delivered to the generator (in particular by a factor 2). This suppresses the risk of seeing the voltage(s) $U(v)$ between two distinct points of the electrochromic structure of the (of at least one of the) glazing(s) exceed the operational voltage range of the glazing, by adapting the current delivered.

For this same purpose, this safety criterion may also include reducing the current delivered when the differential of the (or of at least one of the) voltage(s) with respect to time $dU(v)/dt$ reaches a given threshold value. Finally, a last criterion may, for the purpose of guaranteeing this maintenance within the operational voltage range of the glazing, provide for a reduction of the currant delivered by the generator (in particular again by a factor 2) when the computation of the second differential of the (or of at least one of the) voltage(s) measured between two distinct points of the electrochromic structure of the glazing with respect to time $d^2U(v)/dt^2$ reaches a given threshold value; this still involves avoiding the drift of the voltage(s) between two distinct points of the electrochromic structure of the glazing towards values which might degrade the electrochromic system.

A provision may be made for having two distinct threshold values, one valid in coloration and the other in decoloration, on each occasion.

Another safety criterion may include requiring that the difference in absolute values between the power supply setpoint current i(c) and the current actually measured for example at the terminals of the glazing should remain less than an initialized given value. This provides assurance of the similarity between setpoint current and actual current. This also provides protection against any possible problems with the ammeter.

It is also possible to apply some of the above-stated safety criteria in the case where use is made of a voltage generator, and more particularly that requiring the maintenance of the measured temperature within an initialized temperature range.

The power supply process according to the present invention is very readily adapted to the drive of varied electrochromic glazing(s), of differing applications, especially glazings for vehicles of the side or rear glazing type or sunroof glazings, which may possibly be bent, but also interior or exterior glazings for buildings.

This may thus involve electrochromic glazings of laminated structure for exterior use, including an exterior first sheet of glass, a mounting organic polymer layer filtering ultraviolet rays, an intermediate second sheet of glass and an interior third sheet of glass, between which are disposed the layers of the stack of the electrochromic system, including two edged electrically conductive layers each equipped with a screen-printed conductive track connected to an external current infeed. The second sheet is preferably of smaller size than the other two, thus delimiting a peripheral groove in which there is disposed a seal or double seal, flush with their edges or encapsulating them.

These glazings may be designed to be movable in relation to a fixed frame of the window frame type or vehicle body opening type, advantageously without interruption of electrical connection to the drive circuit, irrespective of the position in relation to the frame.

A laminated structure as described above may advantageously be supplemented by a fourth sheet of glass combined with the third sheet via an insert gas space to form a multiple glazing of the insulating type, as is described for example in the European Patent EP-575 207.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
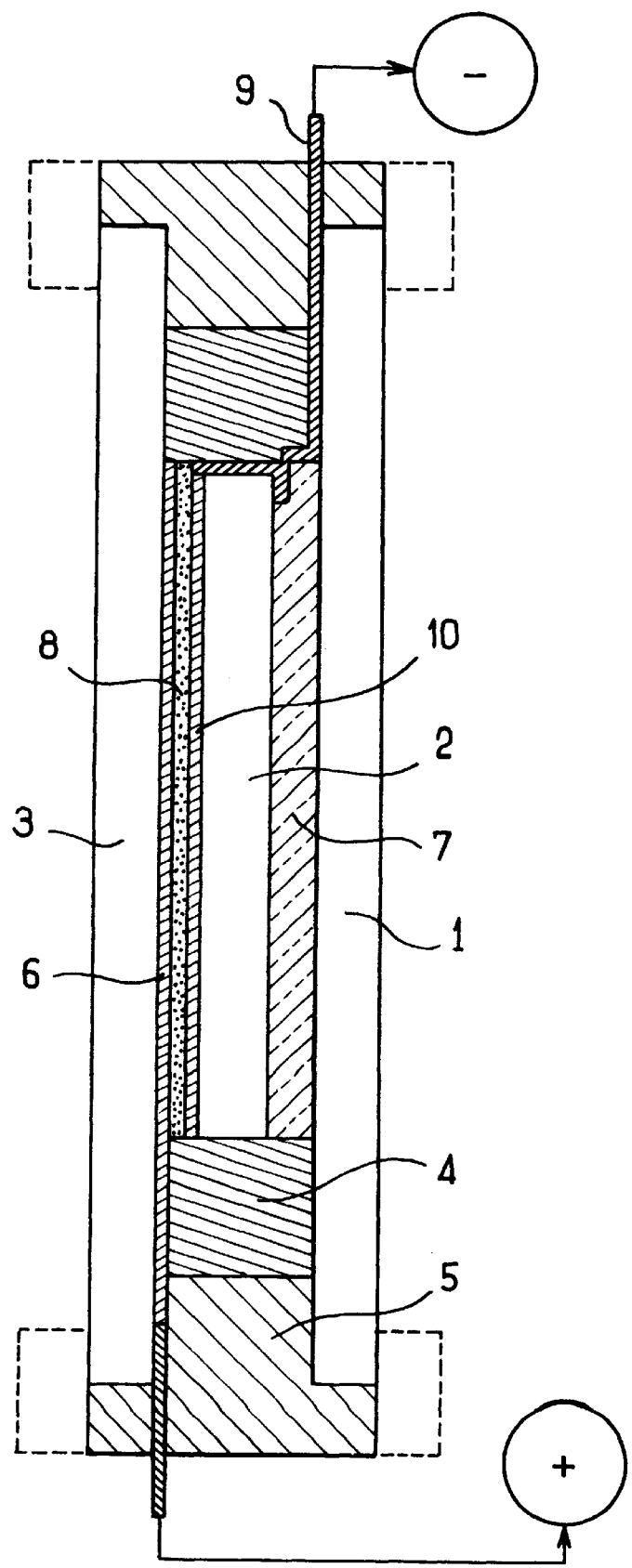
FIG. 1 shows a diagrammatic cross-sectional representation of an electrochromic glazing.

Referring now to the drawings, wherein like reference numerals designated identical or corresponding parts throughout the several views, and more particularly to FIG. 1 thereof, which shows a glazing represented in cross-section, without respecting proportions in order to facilitate the reading thereof, which is intended to be mounted as a sunroof in a vehicle. The glazing includes three substrates 1, 2, 3 of alkali lime silicate clear glass of float type, the first 1 having a thickness of approximately 1.5 to 1.7 mm, the second 2 having a thickness of approximately 1.8 to 2 mm and the third 3 likewise having a thickness of approximately 1.8 to 2 mm. The substrates are almost rectangular, the glasses 1 and 3 having a size of approximately 40×80 cm$^2$. It is the glass 1 which is intended to be disposed on the outside of the vehicle. In conventional fashion, each one of the faces of the glasses will be numbered hereinbelow from 1 to 6, commencing with the exterior glass 1. The three glasses are slightly bent and the second, which is slightly smaller than the other two, enables the delimiting of a peripheral groove between the glasses 1 and 3 of a depth of approximately 5 to 9 mm, in which the seals 4, 5 are disposed. The first seal 4 may be of butyl, and the second 5 may be of polysulphide or of polyurethane. The double seal may be flush, or, as indicated by the dotted lines, may project beyond or even encapsulate the periphery of the glasses 1 and 3.

The glasses 1 and 2 are assembled by a layer of polyvinylbutyral PVB 7 containing anti-ultraviolet additives, having a thickness of approximately 0.3 to 1 mm. Between the glasses 2 and 3 there is situated the electrochromic stack 8, of the same type as that described in the above-cited patents, to which reference will be made for further details. An electrically conductive layer of type ITO or $SnO_2$:F is formed on the faces 4 and 5, each edged over a distance of approximately 5 to 10 mm over their length, so that the edges are diametrically opposite (the edging is undertaken in the course of the depositing by masking or after depositing by chemical scouring or mechanical scouring of the sandblasting type). This precaution is useful for avoiding a situation in which harmful significant short circuits are created directly from one electrochromic layer to the other via the seal 4, when the seal 4 is possibly slightly electrically conductive. Between the two electrically conductive layers there are disposed an electrochromic layer of $IrO_2$ and an electrochromic layer of $WO_3$ which are separated by a layer of polymeric electrolyte based on a solid solution of polyoxyethylene and phosphoric acid. In this particular case, what is involved is accordingly an electrochromic system operated by proton transfer. However, it is self-evident that it is possible just as well to use an electrochromic glazing operating by transfer of lithium ions, for example by substituting nickel oxide in place of iridium oxide and by adopting another type of electrolyte such as polyoxyethylenes doped with lithium triflate, or any other electrochromic system.

Two screen printed tracks of silver paste 6, 10 are covered with an insulating enamel, again to prevent any accidental short circuit. Tracks 6,10 serve as strips to conduct current to the conductive layers, and are diametrically opposite to one another, and are connected by silver moldering to metal wires 9 of the copper strip type "emerging" from the glazing at face 2 or 6 for one, 5 or 6 for the other, possibly with tracking on the edge of one of the sheets of glass. The fixing of tracks 6,10 is then provided by silver soldering and/or adhesive bonding on glass.

Let us take the first embodiment of the electric drive of such a glazing connected in parallel with a second identical glazing, and which includes choosing a voltage generator as a source of electricity. The structure of the drive system is then, diagrammatically, as the following.

At the terminals of one of the two glazings which is provided with current leads, the voltage U(v) is measured with the aid of a voltmeter, and the current i(v) at the terminals of the generator is measured with the aid of an ammeter connected to a current integrating means Q of the coulometer type. The circuit also includes a clock, electronic computing means, a control unit equipped with a user interface and a temperature measuring means of the thermocouple type associated with one of the glazings. The mode of driving the glazing is diagrammatically represented in FIG. 2 in the form of a simplified operational chart showing the logic sequence of the operations initiated by the drive commands. The operation is the following:

an operator first of all regulates the control unit, in particular by introducing:

the quantity of charges $Q_{(c)}=-100$ C corresponds to "the state of charge" of the glazings in their state of maximum coloration ($T_L$ of the order of 5%) and the quantity of charge $Q_{(d)}=0$ corresponds to the zero "state of charge" of the glazings in their state of maximum decoloration ($T_L$ of the order of 30%), the operational temperature range: $-20°$ C. to $+80°$ C., the setpoint voltage valued $U_C$ (T), in coloration and in decoloration, which are chosen depending on the type of electrochromic glazing and in dependence upon the operating temperature included in the preceding temperature range, the minimum current $I_{min}$ chosen between 0.1 and 10 mA, which is able to flow in the circuit, the time $t_{max}$ to be counted by the clock, in particular from 1 to 24 hours, the setting of resistive loss value r of 0.1 to 1 ohm, the tolerance with respect to the voltage differences between setpoint voltage and measured voltage: 25 mV, "the state of charge" $Q_i$ of the glazing at the instant of its connection to the circuit, a user may then activate 3 drive command buttons at the location of the interface: $A_1$ corresponding to a coloration, $A_2$ to a halt, $A_3$ to a decoloration.

If the user activates the coloration ($A_1$), the control unit records the drive command and first of all verifies that the temperature sensor of the glazing measures a temperature included within the stability range, and stores this temperature value. It reads the state of charge $Q_j$ measured by the collimator at the end of the powering instruction due to the preceding drive command, and which it has stored. It compares this with the state of charge to be reached. This operation is represented by step S20. It then initiates a power supply by the generator of a voltage U(g) defined such that the voltage U(v) at the terminals of the glazing is as close as possible to the setpoint voltage U(c) which it has determined by the measurement of the temperature carried out at the outset by the thermocouple, see step S22. The control unit stops the power supply and reverts to the waiting position (with, in particular, rezeroing of the coulometer) as soon as the value Q measured reaches the value $Q_{(c)}$ which was initialized, or as soon as the measurement of the current i reaches the value $I_{min}$ which was initialized at the outset, see step S26. Otherwise, the electricity power supply is continued via a looping to successive measurements of Q and i. In parallel, in each "loop", while one or the other of these values $Q_{(c)}$ and $I_{MIN}$ is not reached, the generator verifies, for example at a frequency of a few milliseconds, the following safety criteria 1–5 (not represented in FIG. 2).

1. the measured temperature remains between $-20°$ and $+80°$ C.,
2. the differential of the measured temperature with respect to time remains less than or equal, in absolute value, to 2 K/s,
3. the difference U(a)–U(v) measured is less than 25 mV in absolute value,
4. the difference between the voltage delivered U(g) and the setpoint voltage U(c) is less in absolute value than the product of r, the initialized value, and the measured current value i,
5. the measured current is not zero.

It may be noted, concerning this latter criterion, that the control unit also verifies it on "leaving" the looping process, when the current i clears the threshold of $I_{min}$. It is in fact also necessary to verify at this level if the clearing of this threshold is indeed due to the fact that the desired coloration has been reached, or whether an accidental disconnection is involved.

Figure 2:
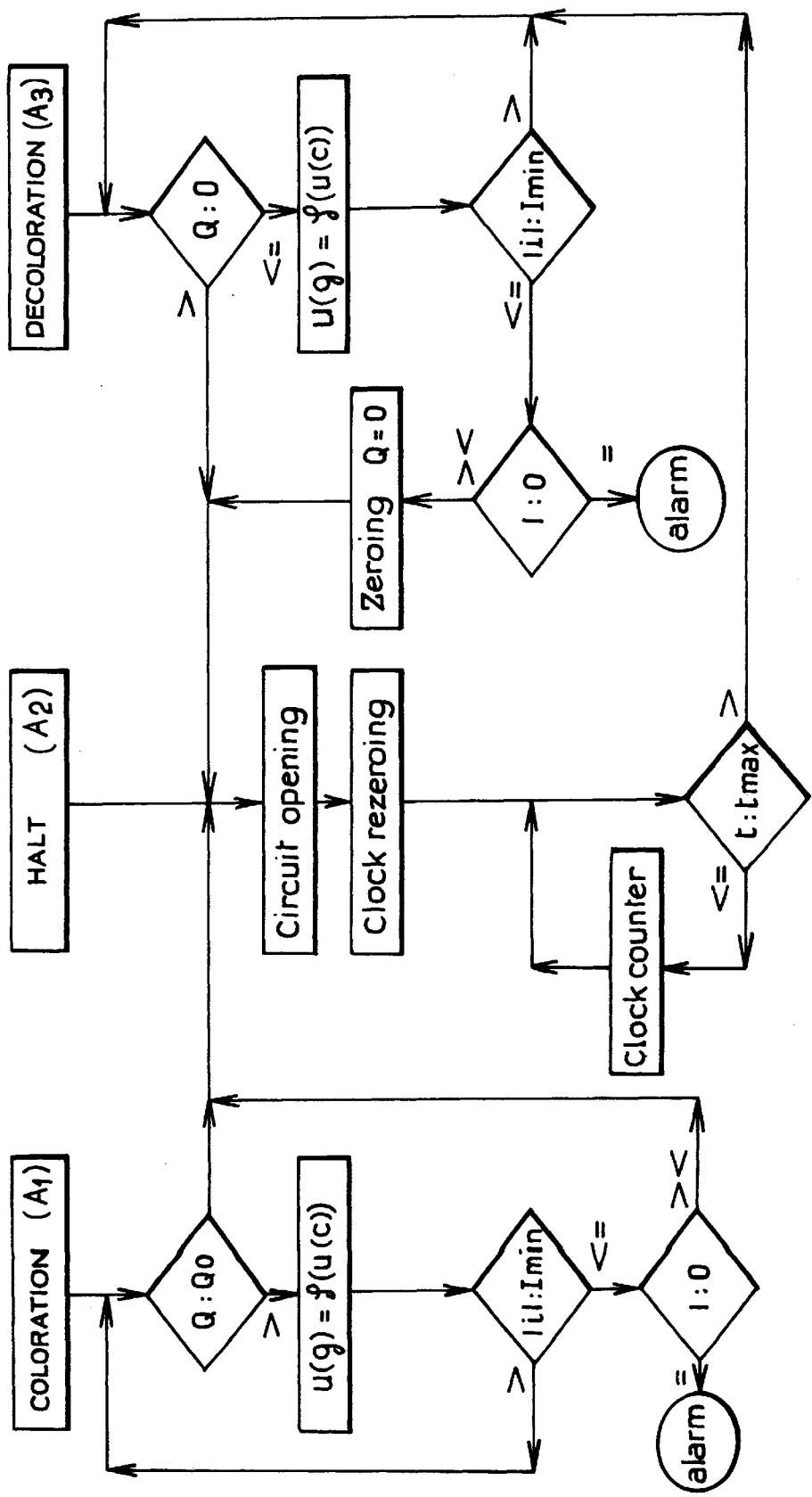
FIG. 2 shows a diagrammatic representation of a drive operational chart, in a case of a power supply by a voltage generator.

If one of the criteria is not complied with, the control unit halts the powering process, opens the electrical circuit (in FIG. 2: "alarm" mode S28, S42). It is then possible to provide an optical or acoustic indication warning the user of an improper operation, necessitating a manual reenergization either accessible to the user or exclusively accessible to a specialist operator, depending upon the seriousness of the noncompliance with the safety criterion in question.

The user may also at any time interrupt the coloration process by the drive command $A_2$, which cuts off the electrical power supply (as if the maximum coloration target had been reached), resulting in opening of the circuit, see step S30, rezeroing of the clock, see step S32.

In a similar way to the coloration drive command $A_1$, the user may activate the decoloration drive command $A_3$, with reading of the current state of charge Q to compare it this time with $Q_{(d)}=0$ and a voltage power supply setpoint of opposite sign, again a function of the measured temperature and adapted, on this occasion, to a decoloration. The "looping" of steps S44–S38 is performed as previously with verification of the same safety criteria until such time as the charge Q reaches the value $Q_{(d)}=0$ or i reaches the value $I_{MIN}$.

As soon as the target for decoloration (or in identical fashion for coloration) has been reached or the user has interrupted the process by the drive command $A_2$, the clock undertakes the counting of the time, see step S36, and informs the control unit as soon as the initialized time t, for example 8 hours, has elapsed, see step S34. The control unit then automatically itself initiates a decoloration drive command $A_3$ to return the glazing, which is in an intermediate or maximum state of coloration, to the completely decolored state.

The three drive commands $A_1, A_2, A_3$ are prescribed to be mutually exclusive.

Let us now take the second embodiment of the electrical drive of the invention, making use of a current generator, with the same two glazings, this time connected in series. The voltmeter, the ammeter, the coulometer and the thermocouple which were used previously are retained, as well as the clock, electronic computing means and the same control unit equipped with a user interface.

Figure 3:
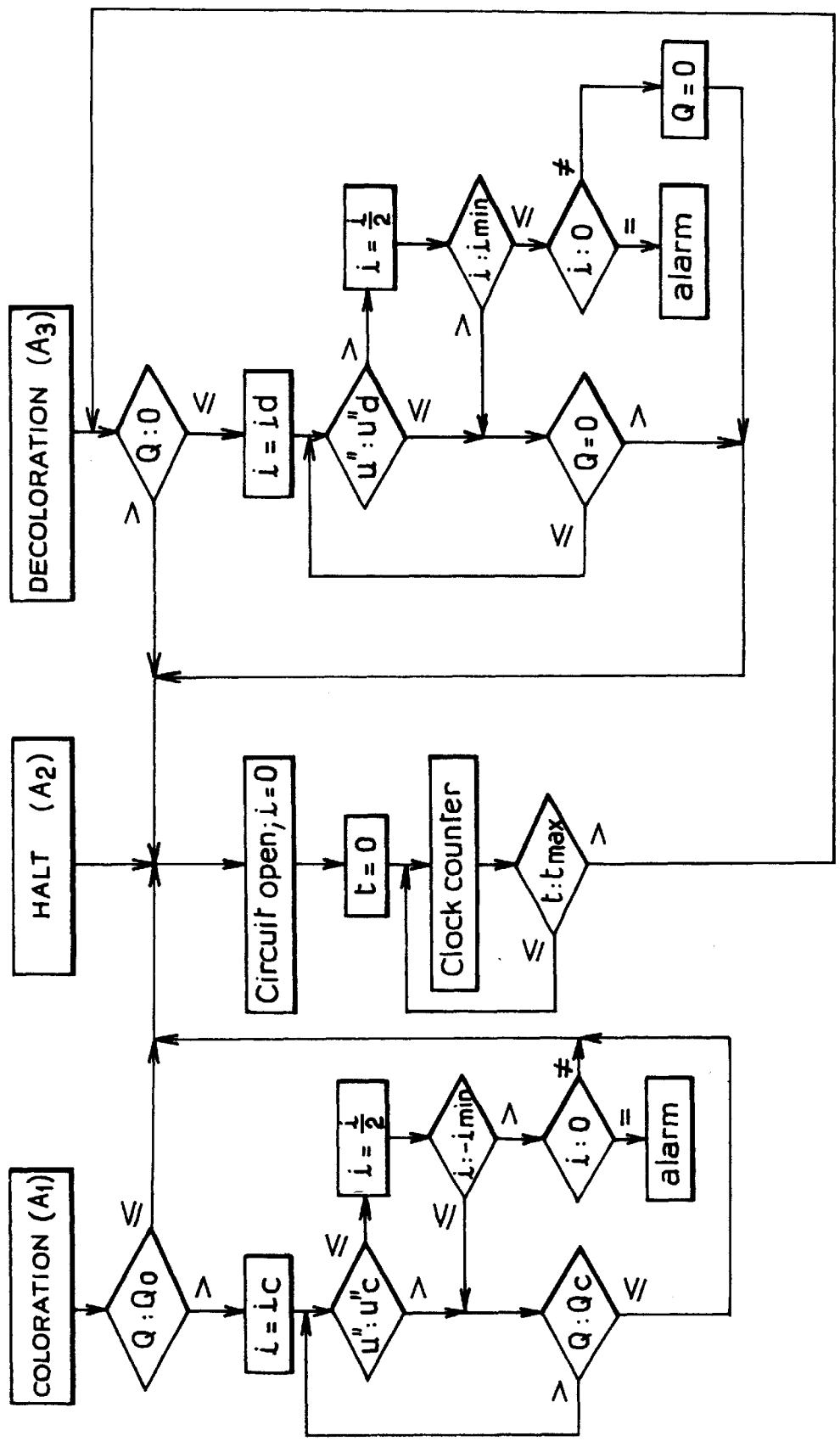
FIG. 3 shows a diagrammatic representation of a drive operational chart, in a case of a power supply by current generators.

The current drive is diagrammatically represented in FIG. 3 in the form of a simplified operational chart.

Its operation is the following:

an operator regulates the control unit, in particular by introducing the same values of $Q_{(c)}$, $Q_{(d)}$, range of temperature, $I_{MIN}$ in absolute value, $t_{MAX}$ and $Q_i$ as previously. The user likewise introduces:

the threshold values of the second differential of the voltage with respect to time, in coloration $U''_{(c)}$, and in decoloration $U''_{(d)}$ which have been chosen, in absolute value, between 0.1 and 10 mV/s², in particular approximately 0.5 mV/s².

the tolerance with respect to the current differences between setpoint current and measured current: 0.1 mA, the coloration current value $I_{(c)}=-100$ mA the decoloration current value $I_{(d)}=+200$ mA.

The user still has the same drive commands: $A_1$, $A_2$ or $A_3$. If the user activates a coloration $A_1$, as previously, the control unit records the drive command, verifies by the thermocouple that the values are within the initialized operating temperature range and reads the state of charge Q which has been stored, see step S100. It then initiates a power supply by the current generator i(c) which power supply is adapted to the drive command, see step S102. As previously, the power supply is continued while the current measured at the terminals of one of the glazings has not reached the value $I_{min}$ or while the state of charge Q has not reached the value $Q_{(c)}$.

In parallel, in each "loop" the generator verifies the following safety criteria 1–4:

1. the temperature measured by the thermocouple remains within the range −20° C. +80° C.,
2. the difference in absolute value between the current measured at the terminals of the glazing and the setpoint current $I_{(c)}$ remains less than or equal to 0.1 mA,
3. the second differential of the voltage measured at the terminals of the glazing with respect to time U" remains strictly greater than the initialized threshold value $U_{(c)}$", see step S104,
4. the current measured at the terminals of the glazing is not zero.

If one of the criteria 1, 2 or 4 is not complied with, the control unit interrupts the powering instruction. There is opening of the circuit, see step S114, and transfer to "alarm" mode as previously. The same remark concerning the criterion 4 which was made previously is applicable: the control unit must also verify this criterion on "leaving" the loop.

If it is the criterion 3 which is not complied with, the control unit reduces by 2 the setpoint current value $i_{(c)}$ imposed on the generator, see step S106; the effect of this is to prevent a situation in which the voltage at the terminals of the glazing reaches values which might have a degrading effect, without nevertheless stopping the coloration process. It will be possible to refer, on this matter, in particular to the above-cited patent application EP-683 419. It should be noted that it is possible to provide a time delay on the computation of U" after each reduction of the current by a factor 2, in order to allow the voltage to stabilize at the terminals of the glazing following this modification of power supply, it being possible for a control of the voltage to be carried out during this time delay.

The decoloration setpoint operates in symmetric fashion, see steps S122–S138. The clock fulfills the same function as previously.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters: Patent of the United States is:

1. An electrochromic system comprising
   at least one electrochromic glazing including conductive layers;
   an electrical drive circuit connected to the conductive layers of the at least one glazing;
   an electricity generator to supply power to the at least one glazing;
   a control unit equipped with a user interface to provide powering instructions to the electricity generator;
   a counter connected to the control unit for counting time;
   means for measuring and computing physical characteristics of the electrical drive circuit and of the at least one glazing including at least one means for measuring an electrical voltage between two distinct points of the at least one glazing, a means for measuring an electric current and a means for measuring a state of coloration of the at least one glazing;
   wherein the control unit is initialized by initialized data by using operational data characteristics of the at least one glazing and of the electrical drive circuit, including two limits of a predetermined range of state of coloration of the at least one glazing;
   wherein the control unit records a coloration state modification drive command activated with aid of the user interface;
   wherein the control unit initiates a powering instruction dependent upon the initialized data and the measurements of physical characteristics of the electrical drive circuit, including the measurement of the state of coloration of the at least one glazing;
   wherein the control unit follows the coloration state modification of the at least one glazing and, simultaneously, checks at a predetermined frequency compliance with at least one safety criterion determined by the initialized data or the measurement of the at least one physical characteristic of the electrical drive circuit or of the at least one glazing;
   wherein the control unit modifies a powering instruction in an event of non-compliance with the at least one of the safety criterion;
   wherein the control unit stops the powering instruction by an intentional interruption at the user interface or by the at least one glazing reaching a predetermined state of coloration.

2. The electronic system according to claim 1, wherein modifying of the powering instruction from the control unit on non-compliance with the at least one of the safety criterion includes the control unit commanding opening of the electrical drive circuit.

3. The electronic system according to claim 1, wherein stopping of the powering instruction from the control unit by the at least one glazing reaching the predetermined state of coloration occurs when the at least one glazing reaches one of the two limits of the predetermined range of state of coloration.

4. The electronic system according to claim 1, wherein the coloration state modification of the at least one glazing is followed by measurements of a state of charge by a means for measuring a state of charges Q of the at least one glazing, by a current integrating coulometer.

5. The electrochromic system according to claim 4, where the two limits of the predetermined range of state of coloration of the at least one glazing are initialized to $Q_{(d)}=0$ in a most decolored state and $Q_{(c)}$ in a most colored state.

6. The electrochromic system according to any one of claims 1 to 3, wherein the coloration state modification of the at least one glazing is followed by measurements of a light transmission $T_L$, of the at least one glazing, by a sensor fixed to said at least one glazing, with the two limits of the predetermined range of possible states of coloration $T_{L(d)}=$ 50% in a decolored state and $T_{L(c)}=5\%$ in a colored state.

7. The electrochromic system according to any one of claims 1 to 3, wherein the coloration state modification of the at least one glazing is followed by measurements of a release potential by a voltmeter.

8. The electrochromic system according to claim 1, wherein the electrical drive circuit permits the electrical power supply of at least two electrochromic glazings, which are connected in parallel if the electricity generator is a voltage generator, or are connected in series if the electricity generator is a current generator.

9. The electrochromic system according to claim 1, wherein the control unit provides to the electricity generator a powering instruction to decolor the at least one glazing when the at least one glazing has been maintained in a maximum or intermediate state of coloration for a predetermined time.

10. The electrochromic system according to claim 1, wherein the activating of the coloration state modification drive command is undertaken manually or by automated regulation to a measurement of an illumination or of solar flux by a sensor.

11. The electrochromic system according to claim 1, wherein one of the safety criterion is that electric current measured by an ammeter at terminals of the electricity generator or of the at least one glazing are different from zero.

12. The electrochromic system according to claim 1, wherein one safety criterion is that a temperature measured when the electricity generator delivers a voltage to terminals of the at least one glazing remain within an initialized range of temperatures.

13. The electrochromic system according to claim 1, wherein a temperature of the at least one glazing is measured either directly by a thermocouple placed in proximity to the at least one glazing, or indirectly by an electrical pulse delivered by the electricity generator.

14. The electrochromic system according to claim 1, wherein the electricity generator is a voltage generator capable of delivering, under the powering instruction received from the control unit, at least one voltage such that a voltage measured between two distinct points of the at least one glazing is equal to a set point voltage having a profile of a function of an activated drive command and of a temperature.

15. The electrochromic system according to claim 14, wherein one of the safety criterion includes verifying, when the electricity generator delivers a voltage to terminals of the at least one glazing, that a difference in absolute values of voltages at the terminals remains less than or equal to an initialized given voltage value of 25 mV.

16. The electrochromic system according to either one of claims 14 or 15, wherein one of the safety criterion includes measuring a temperature and then computing when the electricity generator delivers a voltage to terminals of the at least one glazing, a differential of the measured temperature with respect to time, in order to verify that said differential remains less than or equal to an initialized given value of approximately 1 K/s.

17. The electrochromic system according to either one of claims 14 to 15, wherein one of the safety criterion includes verifying, when the electricity generator delivers a voltage to terminals of the at least one glazing, that a difference in absolute value of the voltages at the terminals is less than or equal to a product of a current i measured at terminals of the electricity generator and a value r equivalent to an initialized resistance.

18. The electrochromic system according to claim 1, wherein the electricity generator is a current generator for delivering, under a powering instruction received from the control unit, a current of a profile adapted to the activated drive command.

19. The process of electrical power supply according to claim 18, wherein one of the safety criterion includes that, when the coloration state modification drive command is a decoloration, the control unit requires a reduction of the current delivered by the electricity generator by a factor 2, when a second differential with respect to time of at least one voltage measured between two distinct points of the electrochromic structure of the at least one glazing reaches an initialized threshold value of 0.5 mV/s$^2$ in absolute value.

20. The process of electrical power supply according to either one of claims 18 or 19 wherein one of the safety criterion includes that a difference in absolute value between a set point current and a current actually measured remains less than or equal to an initialized value of 0.1 mA.

21. The process of electrical power supply according to claim 1, wherein the electrochromic glazings are equipping vehicles as side glazings, rear glazings and car sunroof glazings.

22. The process of electrical power supply according to claim 1, wherein the electrochromic glazings are equipping buildings as interior and exterior glazings.

* * * * *